(12) United States Patent
Li

(10) Patent No.: US 6,876,529 B2
(45) Date of Patent: Apr. 5, 2005

(54) ELECTROSTATIC DISCHARGE PROTECTION CIRCUIT

(75) Inventor: Larry B. Li, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 334 days.

(21) Appl. No.: 09/738,127

(22) Filed: Dec. 15, 2000

(65) Prior Publication Data

US 2002/0075614 A1 Jun. 20, 2002

(51) Int. Cl.[7] .................................................. H02H 9/00
(52) U.S. Cl. ....................................................... 361/56
(58) Field of Search .......................... 361/56, 111, 91.1

(56) References Cited

U.S. PATENT DOCUMENTS

| | | | | |
|---|---|---|---|---|
| 4,875,130 A | * | 10/1989 | Huard .......................... | 361/56 |
| 5,173,755 A | | 12/1992 | Co et al. ..................... | 257/361 |
| 5,392,185 A | * | 2/1995 | Haas et al. ................... | 361/56 |
| 5,537,284 A | * | 7/1996 | Haas et al. .................. | 361/111 |
| 5,631,793 A | | 5/1997 | Ker et al. ..................... | 361/56 |
| 5,670,885 A | * | 9/1997 | Iwai et al. ................... | 324/550 |
| 5,781,389 A | | 7/1998 | Fukazako et al. ............. | 361/56 |
| 5,789,785 A | * | 8/1998 | Ravanelli et al. ............ | 257/361 |
| 5,838,146 A | | 11/1998 | Singer ......................... | 323/270 |
| 5,936,284 A | | 8/1999 | Ravanelli .................... | 257/361 |
| 5,969,929 A | | 10/1999 | Kleveland et al. .......... | 361/111 |
| 6,147,852 A | * | 11/2000 | Ravanelli ..................... | 361/111 |
| 6,292,046 B1 | * | 9/2001 | Ali .............................. | 327/310 |
| 6,327,125 B1 | * | 12/2001 | Colclaser et al. ............. | 361/56 |

FOREIGN PATENT DOCUMENTS

EP    0 435 047 A2    7/1991    ........... H01L/27/02

OTHER PUBLICATIONS

Chatterjee, A Low Voltage Triggering SCR for ON–Chip ESD Protection at Output and Input Pads, IEEE Electron Device Letters, vol. 12, No. 1, Jan. 1991, pp. 21–22.

Duvvury. Rountree & Adams, Internal Chip ESD Phenomena Beyond the Protection Circuit, IEEE Transactions on Electron Devices, vol. 35, No. 12, Dec. 1988, pp. 2133–2138.

* cited by examiner

*Primary Examiner*—Brian Sircus
*Assistant Examiner*—James A Damakis
(74) *Attorney, Agent, or Firm*—Thomas, Kayden, Horstemeyer & Risley, L.L.P.

(57) ABSTRACT

The present invention is directed to a circuit that may be used to protect other circuits from Electrostatic Discharge ("ESD"). A circuit of the present invention comprises a transmission line that couples a source with a circuit that is being protected. A transistor, with an emitter, a collector, and a base, is coupled in reverse mode between an electrical ground and the circuit being protected. This circuit may be used in applications using high frequencies, such as 1 GHz or higher.

26 Claims, 1 Drawing Sheet

ELECTROSTATIC DISCHARGE PROTECTION CIRCUIT

BACKGROUND OF THE INVENTION

1. Technical Field

The present invention is related to an electrostatic discharge (ESD) protection circuit, and more particularly to an ESD protection circuit designed for use in high frequency circuits.

2. Background Information

Electrostatic charge is typically created by the contact and separation of two materials: many persons have felt the electrical shock that can occur when one touches a conducting surface after having walked across a carpet. These discharges commonly range between 2000 and 4500 volts and are discharged over a few milliseconds; they appear to the victim as an attention-getting, but harmless, electrical shock: the human body provides a high resistance to the discharge of these significant voltages, thereby decreasing the associated current. (The human body model standard assumes that the human body has a capacitance of 100 picofarads (pf) and a series resistance of 1500 ohms. Thus, the peak current flow during a human body ESD event is generally on the order of amps.)

The buildup of electrostatic charge may also occur when charges accumulate upon an ungrounded surface or an electrically non-conductive surface. For example, a piece of equipment, an electronic circuit, or the like, which is not grounded, may collect charges as it is moved from one location to another. An electronic device sliding into or out of a bag can also generate an electrostatic charge. When the charged equipment touches an electrical conductor, an ESD event may occur. The electric current will follow the path of least resistance to the conductor. Unfortunately, the path of least resistance is often through vital electronic circuitry: In microelectronic systems, the conductor is often a prong of a packaged integrated circuit chip.

The wide-spread use of sensitive semiconductor chips in today's industrial and commercial products has made ESD protection a major concern in the design, layout, fabrication, and production of chips. Unlike the human body, which can easily dissipate an ESD event, semiconductor chips are extremely sensitive to ESD. Depending on the technology used in a chip, the maximum safe voltage the internal circuit elements can tolerate varies from approximately five volts to approximately twenty volts. As such, the mere touching of a chip by a non-grounded person or tool may result in an ESD event which can permanently damage the delicate electronic structures in an unprotected chip, possibly rendering the chip useless.

An ESD event through an integrated circuit (IC) can permanently damage the integrated circuit through several failing mechanisms, including the dielectric breakdown of oxides and other thin layers, the melting of conductive material such as polysilicon or aluminum, and the melting of semi-conductive material such as silicon, resulting in excessive leakage currents and open or short circuits in the IC.

To prevent ESD from damaging semiconductor circuits, various protective schemes may be employed. Large-scale protective schemes are often used to protect system level equipment. Examples of these schemes include, but are not limited to, the following: electrical grounding of technicians via wrist bands; the prevention of electrostatic build-up through the use of static-safe clothing, static control shoes, and high humidification; and the use of specialized shipping containers and storage bags. All of the above methods help to prevent the build-up of static charge. Additionally, small-scale, chip specific approaches may be used. Often, high-current clamping devices are placed on the pins of a chip so that the high currents associated with an ESD event are safely shunted away from the circuitry.

Ideally, such clamping devices are transparent during normal chip operations but shunt the high current of an ESD event away from the circuit being protected. This is typically accomplished by using an ESD protection device which is normally "off" but will turn on at a voltage that is well above a chip's normal operating voltage, but below a voltage that can damage the elements of an IC. When the ESD protection device is on, the excess current is passed through the ESD protection device instead of the current traveling through the circuit being protected.

While these circuits perform adequately in circuits that operate at low frequencies, they can adversely effect the operation of high frequency circuits.

The placement of an ESD protection circuit creates a large capacitance due to the ESD protection at the pad. The ESD parasitic capacitance becomes a significant problem around 1–2 GHz of operation; the reactance of the capacitance of a typical ESD protection circuit (1–2 pF) is almost as low as that of the transmission line: it can be very difficult to make a resistive termination with such a large capacitive load. Therefore, a part of the signal is lost through the ESD protection circuit. As a result, high frequency devices often do not include any ESD protection.

Because ESD protection is just as important for high-frequency circuits as it is for lower-frequency circuits, there is a need for an on-chip ESD protection circuit that operates without adversely affecting the performance of the high-frequency circuit.

SUMMARY

The present invention is directed to a circuit placed between the source and a protected circuit. The circuit comprises a transmission line coupling the source and the protected circuit and a transistor connected in reverse mode between an electrical ground and the transmission line. The reverse mode transistor directs any abnormal currents through the reverse mode transistor, thus forcing electrostatic discharges charges away from the protected circuit.

BRIEF DESCRIPTION OF THE DRAWINGS

The invention is further described in connection with the accompanying drawings, where like reference numbers depict like elements, in which.

DETAILED DESCRIPTION OF THE INVENTION

Figure 1:
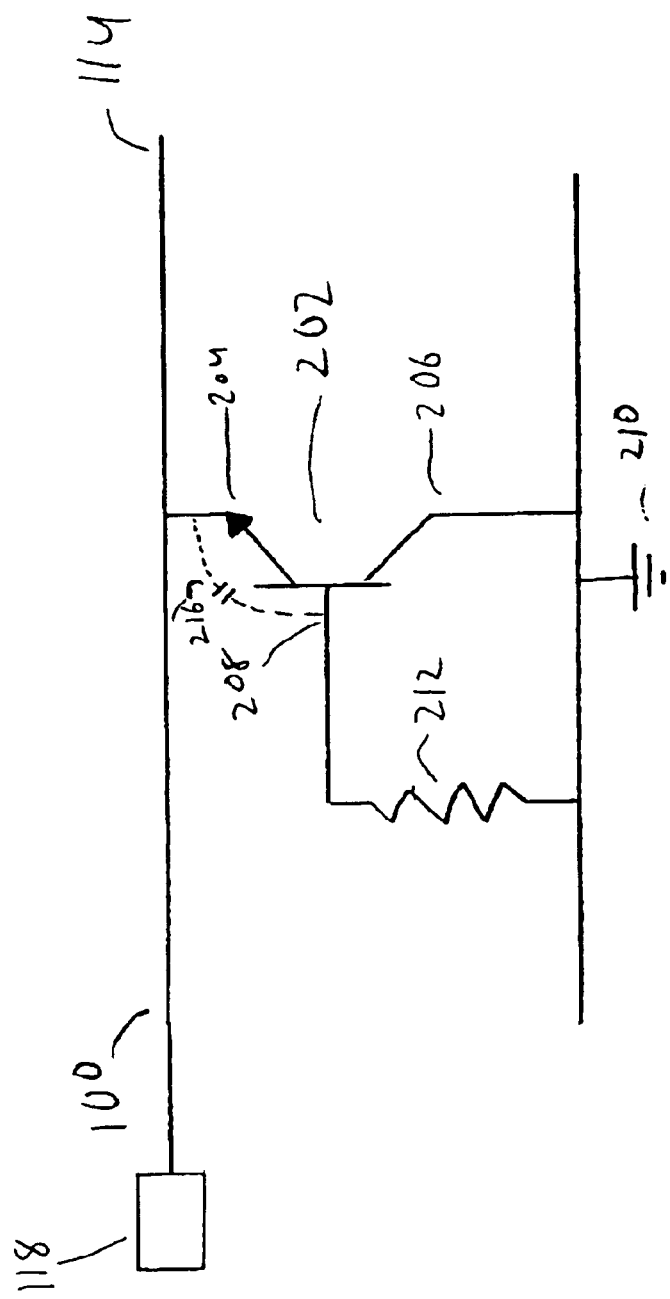
FIG. 1 depicts an embodiment of the present invention.

The circuit depicted in FIG. 1 is an embodiment of the present invention. This circuit is connected between an IC pad 118 at a lead 100 and the rest of a circuit connected at element 114. Transistor 202 is illustrated as an npn transistor. The emitter 204 is connected between the IC pad and the circuit to be protected. The collector 206 is connected to a ground 210. The base 208 is connected to an optional resistor 212. The other end of resistor 212 is also connected to ground 210.

The circuit of FIG. 1 operates in the following manner. When a large negative voltage is present at pad 118, the forward junction from base 208 to emitter 204 is turned on, creating, in effect, a short circuit between base 208 and emitter 204. Thus, the negative charge is delivered to ground 210 instead of traveling to the circuit being protected at 114.

When a large positive voltage is present at pad 118, there is a large voltage between emitter 204 and base 208, resulting in a "soft" breakdown of the pn junction. Preferably, this breakdown occurs at a voltage higher than the operating voltage of the circuit to be protected. The transistor is then operating in the inverse or reverse mode. Collector 206 acts as an emitter and emitter 204 acts as a collector. However, the gain, β, of this transistor in the reverse mode is low, about 4 or 5, as opposed to a β of about 100 for a transistor connected in the typical configuration. The junction between the emitter and the base becomes forward biased; i.e., the transistor is in reverse operation mode. The current is shunted through collector 206 when the base voltage is greater than the collector voltage by about 0.7 volts. Thus, the current caused by the high voltage present at the input is shunted through emitter 204 to collector 206 to ground. Resistor 212 acts to cause a voltage drop between ground 210 and base 208. Resistor 212 may not be necessary if the intrinsic resistance of transistor 202 is sufficiently large to maintain an appropriate base voltage greater than the voltage at collector 206.

Transistor 202 is preferably configured such that the breakdown voltage $BV_{ebo}$ is higher than the operating voltage of the circuit being protected. However, $BV_{ebo}$ must be lower than the breakdown voltage of the circuit being protected. In addition, the leakage current of ESD below $BV_{ebo}$ must be very low.

In FIG. 1, the capacitance, $C_{be}$, between the base 208 and the emitter 204, is indicated by capacitor 216. Because of the configuration of transistor 202, the value of $C_{be}$ is approximately 10 times greater than the value of $C_{js}$. Thus, the high frequency performance is much improved. Thus, the response at high frequencies is greatly improved as compared to previous circuits.

The present invention thus provides for a method for protecting a circuit from electrostatic discharges through the connection of a transistor in the reverse mode between a protected circuit and a pad coupled to the protected circuit, where the pad couples the protected circuit to, for example, a transmission line.

The above description presents the best mode contemplated in carrying out the invention. The techniques described above are, however, susceptible to modifications and alternate constructions from the embodiments shown above. For example, while the invention has been described with respect to an npn bipolar junction transistor (BJT), it should be appreciated that this invention can also operate with a pnp BJT. Furthermore, while this invention has been described with respect to high-frequency operation, it should be appreciated that the present invention will operate at any frequency and is thus appropriate for low-frequency circuits as well.

Consequently, it is not the intention to limit the invention to the particular embodiments disclosed. On the contrary, the invention is intended to cover all modifications and alternate constructions falling within the scope of the invention, as expressed in the following claims when read in light of the description and drawings.

I claim

1. A circuit transferring a charge from a source to a reference potential, said circuit being placed between said source and a circuit to be protected, comprising:

a transmission line coupling the source and the circuit to be protected;

a transistor comprising a base, an emitter, and a collector, the capacitance between the base and the emitter being about ten times less than the parasitic capacitance between the collector and the substrate; and an electrical ground;

wherein the transistor is directly connected in reverse mode between the electrical ground and the transmission line.

2. The circuit of claim 1, wherein said transistor is an npn transistor, the collector of said transistor is connected to the electrical ground, the base of said transistor is coupled to the electrical ground, and the emitter of said transistor is connected to the transmission line.

3. The circuit of claim 1, wherein the circuit to be protected operates at a frequency greater than 1 GHz.

4. The circuit of claim 1, further comprising a resistor coupled between the base of said transistor and the electrical ground.

5. The circuit of claim 1, wherein said charge is an electrostatic charge.

6. The circuit of claim 1, wherein said source is coupled to a pad.

7. The circuit of claim 6, wherein said pad is coupled to the lead of a package for an integrated circuit.

8. The circuit of claim 1, wherein said transistor is a pnp, bipolar junction transistor, the emitter of said transistor is coupled to the electrical ground, the base of said transistor is coupled to the electrical ground, and the collector of said transistor is coupled between the electrical ground and the transmission line.

9. The circuit of claim 1, wherein said transistor turns on at a predetermined voltage, wherein said predetermined voltage is higher than the operating voltage of the circuit to be protected.

10. The circuit of claim 9, wherein said predetermined voltage is 5 volts.

11. The circuit of claim 1, wherein said circuit to be protected operates at a frequency greater than 2 GHz.

12. The circuit of claim 1, wherein said transistor has a breakdown voltage less than the breakdown voltage of the circuit to be protected.

13. A method of protecting a circuit from an electrostatic discharge comprising:

providing a bipolar junction transistor, wherein said bipolar junction transistor comprises a base, an emitter, and a collector, and said base of said bipolar junction transistor is coupled to a resistance element;

coupling said transistor between the circuit operating at a frequency above about 1 GHz and a pad coupled to the circuit, wherein, said transistor is configured in reverse mode, the collector of said transistor being connected directly to ground; and using said transistor coupled between the circuit and a pad coupled to the circuit to protect said circuit against electrostatic discharge.

14. The method of claim 13, wherein said transistor is an npn transistor.

15. The method of claim 13, wherein said circuit operates at frequencies over 2 GHz.

16. The method of claim 13, wherein said bipolar junction transistor is configured such that said bipolar junction transistor turns on at a voltage level of 5 volts.

17. The method of claim 13, wherein said transistor is a pnp transistor.

18. A method of using a transistor to protect a circuit operating at a frequency above approximately 1 GHz against electrostatic discharge, the method comprising the steps of:
   providing a bipolar junction, transistor the bipolar junction transistor configured with a breakdown voltage less than the breakdown voltage of the circuit to be protected;
   operating the bipolar junction transistor in reverse mode between a transmission line and ground to protect the circuit operating at a frequency above approximately 1 GHz from electrostatic discharge; and
   coupling the high frequency circuit to a pad via the transmission line.

19. The method of claim 18, wherein high frequency is above approximately 2 GHz.

20. The method of claim 18, wherein operating the bipolar junction transistor includes operating with a capacitance between a base and an emitter of the bipolar junction transistor being about ten times less than a parasitic capacitance between a collector and a substrate of the bipolar junction transistor.

21. The method of claim 18, wherein operating the bipolar junction transistor includes operating as an npn configured bipolar junction transistor.

22. The method of claim 18, wherein operating the bipolar junction transistor includes operating as a pnp configured bipolar junction transistor.

23. The method of claim 18, further including coupling a source to the pad.

24. The method of claim 18, further including coupling the pad to a lead of a package for an integrated circuit.

25. The method of claim 18, wherein operating includes activating the bipolar junction transistor at a predetermined voltage, wherein said predetermined voltage is higher than the operating voltage of the circuit to be protected.

26. The method of claim 18, further including coupling a resistor between a base of said transistor and the electrical ground.

* * * * *